No. 634,258. Patented Oct. 3, 1899.
E. BEDE.
SYSTEM FOR POWER TRANSMISSION FOR ELECTRIC TRACTION.
(Application filed Sept. 23, 1897.)
(No Model.) 2 Sheets—Sheet 1.

Witnesses
Frank M Archer
Geo. S. Kennedy

Inventor
Emile Bede
by Wm Rosenbaum
atty.

No. 634,258. Patented Oct. 3, 1899.
E. BEDE.
SYSTEM FOR POWER TRANSMISSION FOR ELECTRIC TRACTION.
(Application filed Sept. 23, 1897.)
(No Model.) 2 Sheets—Sheet 2.
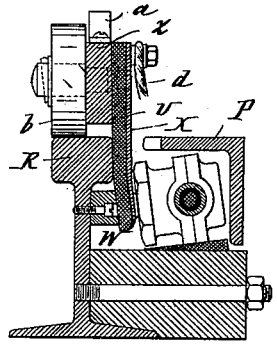
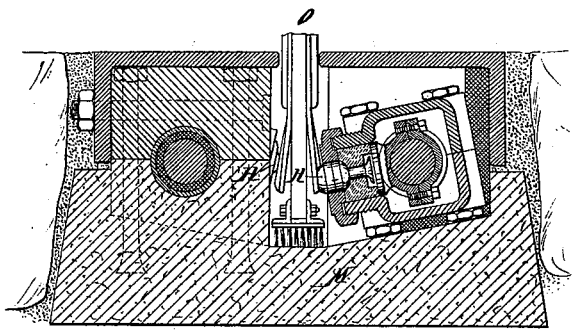
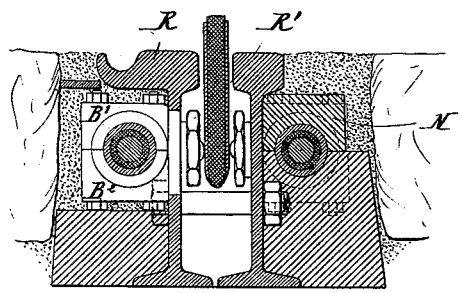
Witnesses
Frank M Archer
H. S. Kennedy.
Inventor
Emile Bede
by Wm A Rosenbaum
atty.

UNITED STATES PATENT OFFICE.

EMILE BEDE, OF BRUSSELS, BELGIUM.

SYSTEM FOR POWER TRANSMISSION FOR ELECTRIC TRACTION.

SPECIFICATION forming part of Letters Patent No. 634,258, dated October 3, 1899.

Application filed September 23, 1897. Serial No. 652,761. (No model.)

*To all whom it may concern:*

Be it known that I, EMILE BEDE, a subject of the King of Belgium, residing at Brussels, Belgium, have invented certain new and useful Improvements in Systems for Power Transmission for Electric Traction, of which the following is a specification, and which was patented in Belgium September 26, 1896, No. 123,721, and in France March 20, 1897, No. 265,188.

The principle of my invention consists in taking the current from the main conductor, placed either between or outside of the rails of the track, said conductor being thoroughly insulated except at certain points where it can be touched by a contact-piece passing through a rubber stopper, which is depressed at the moment the car passes over it, by means of a long band carried by said car, which serves as a current-taker. The elasticity of the rubber breaks the current as soon as the car has passed, so that the rubber stopper works at the same time as an insulator and as a spring. This principle can be applied in a great many ways. I will limit myself to the description of those which seem to me most practical.

Figure 1:
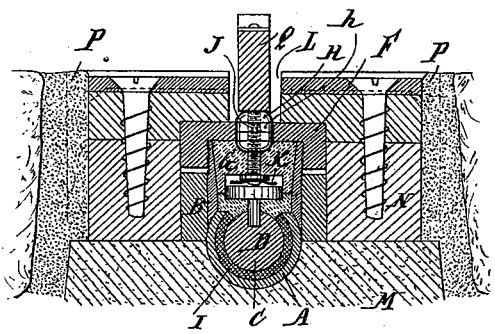
Figure 2:
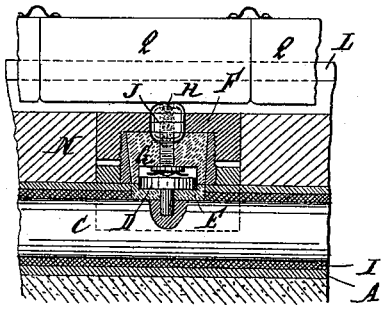
Figure 3:
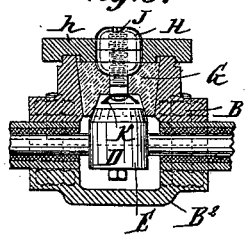
Figure 4:
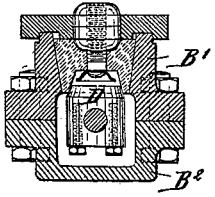
Figure 5:
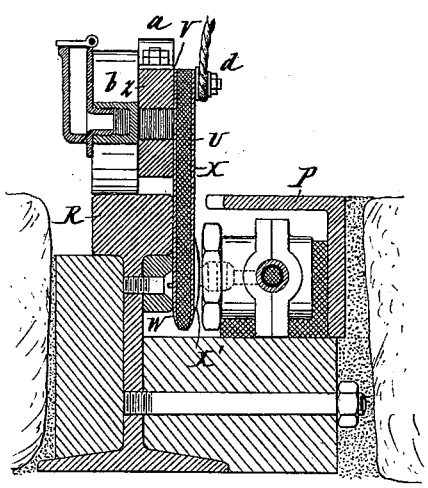

Figure 1 is a cross-section of that portion of the road-bed containing my improved conductor. Fig. 2 is a longitudinal section of the same. Figs. 3 and 4 are sectional views of modifications of the contact-boxes. Figs. 5 and 6 are cross-sections showing slight modifications of the invention. Fig. 7 is a cross-section showing certain modifications, and Fig. 8 shows both positive and negative contact-boxes in the conduit located adjacent to a rail.

The cable is formed of copper wires C, covered by the insulating material I and by a single or double lead tube A. At certain distances—for instance, every two meters—the lead tube and the insulating matter are cut out or traversed by a pin forming the foot of a copper table or plate D, which forms thus one body with the copper of the cable. At these points a tubulure B, bored in the shape of a cone, can be soldered upon the lead tube which surrounds the cable, so that the copper cable will be placed at the bottom of a funnel, yet without touching any part of its walls. It will be well, besides, to cast all around the same some good insulating substance E—as, for instance, pitch, rosin, or wax. A cover F, of ebonite or of some other suitable insulating material, is screwed upon the tubulure. This cover presses into the tubulure the rubber stopper G, through which the contact-piece H J K passes, which at the top ends in the two arched nuts $h$ H of the bolt J and at the bottom in the chased and flexible washer K, which is at a distance of from two to three millimeters from the table or plate D. It will be seen at once that if the nut H, which passes through the cover F, is depressed, the washer K will be put in contact with the table or plate D and will thus take the current directly from the copper cable, while as long as no pressure will be exercised upon the same the current will be broken, the insulation being perfect even at the places where the copper of the cable is not covered.

Instead of soldering tubulures upon the lead tube of the cable I can place upon the same cast-iron boxes made of two pieces $B'$ $B^2$, Figs. 3 and 4, pressed and soldered upon said lead tubes, inside of which the insulating material of the cable is removed in order to adapt locking-pieces D upon the same which represent the tables upon which the washers K of the contact-pieces passing through the rubber stoppers G are eventually depressed. The rubber stoppers G are besides pressed into the tubulures of the boxes by covers F of some insulating substance.

Having thus or in some similar manner constructed a perfectly-insulated conducting-cable the metallic part of which can be brought in conducting contact from the outside by pressing a button, it will be easy to apply the same to the electric traction. First, I can place the cable between or outside the rails (see Figs. 1 and 2) in a narrow conduit L, at the bottom of which are located the contact-buttons H, while the cable rests upon a bottom M of concrete or asphalt and is protected by string-pieces N of hard wood, the latter being covered by angle-irons P, bolted laterally upon the same, so that the bolt-heads which are afterward sunk in asphalt cannot get loose. The tubulures B or the boxes $B'$ $B^2$ are placed in somewhat-enlarged parts of the conduit, and at those points notches are cut in the angle-irons in order to allow of the removal of the covers F and of the rubber stoppers G which may be in bad condition, thus enabling to replace the same without discontinuing the service. The buttons H which might have become worn out can be replaced in the same manner without removing the nuts $h$. In order to take the current, it will be sufficient to attach under the car a long band Q, sliding over the buttons H. This band Q is formed of articulated pieces in order that they may move easily over curves, switches, or crossings. The links rest upon or slide over the buttons H and depress the same by their weight. The band communicates with the electromotors and transmits to them the current of the cable. The conduit L, in which the current-taker moves, can be very narrow, as shown in Figs. 1 and 2. Brushes attached to the car cleanse the same constantly, said conduits being interrupted at certain distances by drain-pipes communicating with the sewers.

With the just-described arrangement, derivated currents could be generated between the contact-pieces and the rails during rainy weather or during the time that the snow is melted by means of salt. This defect is inherent to all systems with superficial contact I know. I can avoid this, and, at the same time, every possibility that passers-by, animals, or vehicles can come in contact with the buttons H by placing the cable with its boxes or tubulures in such a manner that the contact-pieces have their horizontal axes, as shown in Figs. 5 and 6. It will be seen that the boxes are placed outside of the rails and that one of the rails R is used as one of the sides of the conduit wherein the current-taker moves. Long blocks of concrete M are pressed, cemented, or bolted upon that rail. Indentations are made in the top of these blocks M to locate the contact-boxes, and a semicylindrical groove is made therein to place one-half of the insulated conductor A, which is covered by grooved string-pieces N of suitably-prepared hard wood and then with angle-irons P, which are bolted to the blocks of concrete and to the wooden string-pieces, while all the nuts are sunk in asphalt cast between the angle-irons P and the pavement. At certain distances the blocks of concrete are separated for an interval of from two hundred to three hundred millimeters, for instance, which corresponds with the width of drain-pipes communicating with the sewers, so that the water can never rise enough in the gutter which contains the cable to wet the surface of the boxes or tubulures or the inner surface of the angle-irons. In order to guard the boxes against humidity, they can be tarred or pitch or some similar substance can be cast around them. It will be possible also to prevent the contact-buttons from getting humid by inclining the boxes as is shown in Fig. 8, provided that in such case the lower part of the current-taker must also be inclined.

It is obvious that all necessary organs for cleansing the conduit can be adapted to the current-taker or that these organs can be arranged separately under the cars.

All devices described hereinabove can be used with a double conductor if it is not desired to let the current pass through the rails. It will simply be necessary to place two cables (see Fig. 7) opposite the one to the other upon the same bottom of concrete M, while the boxes are arranged lozenge-like in order to separate the bottoms H H', which communicate with the poles of opposite denomination of the current. One single current-taker Q will pass between the rows of boxes and establish the connection between the electromotors and the two cables. Fig. 8 shows such a method of construction which seems simple and practical and consists in connecting, by means of cross-beams, with one of the rails R of the track a similar rail R', each of said rails carrying its series of boxes arranged alternatingly, so as to form a lozenge, resting upon a bed of concrete cast between the rails and the pavement and shaped in such a manner that they can receive one-half of the lead tube of the cables and the boxes B' B². The upper part of the cable can further be protected by the string-pieces N and by casting asphalt in all empty spaces. At certain distances part of the rails will be notched above drain-pipes which communicate with the sewers.

What I claim is—

In an electric railway, the combination with the road-bed of a conductor suitably located therein, said conductor being provided with an insulating-sheath having boxes or enlargements at intervals inside of which the conductor is bare, said boxes being provided with openings, rubber stoppers in said openings, plates covering the stoppers, contact pieces or plungers passing through the stoppers and being insulated thereby, said pieces or plungers provided with buttons on their outer ends which pass through said cover-plates and abut against the rubber stoppers, the plungers adapted to be forced into contact with the bare conductor by the passing vehicles, and removed therefrom by the elasticity of the rubber acting against the buttons, substantially as described.

In testimony whereof I have signed this specification in the presence of two subscribing witnesses.

EMILE BEDE.

Witnesses:
 GEO. W. ROOSEVELT,
 GREGORY PHELAN.